(12) United States Patent
Csoti

(10) Patent No.: US 10,581,291 B2
(45) Date of Patent: Mar. 3, 2020

(54) STATOR FOR AN ELECTRIC MACHINE, AND METHOD FOR MANUFACTURING SAME

(71) Applicant: Robert Bosch GmbH, Stuttgart (DE)

(72) Inventor: Tamas Csoti, Kisszallas (HU)

(73) Assignee: Robert Bosch GmbH, Stuttgart (DE)

( * ) Notice: Subject to any disclaimer, the term of this patent is extended or adjusted under 35 U.S.C. 154(b) by 368 days.

(21) Appl. No.: 15/541,955

(22) PCT Filed: Dec. 28, 2015

(86) PCT No.: PCT/EP2015/081267
§ 371 (c)(1),
(2) Date: Jul. 6, 2017

(87) PCT Pub. No.: WO2016/110427
PCT Pub. Date: Jul. 14, 2016

(65) Prior Publication Data
US 2018/0034331 A1    Feb. 1, 2018

(30) Foreign Application Priority Data

Jan. 7, 2015 (DE) .......................... 10 2015 200 095

(51) Int. Cl.
*H02K 3/28* (2006.01)
*H02K 15/095* (2006.01)
(Continued)

(52) U.S. Cl.
CPC ................ *H02K 3/28* (2013.01); *H02K 1/16* (2013.01); *H02K 1/18* (2013.01); *H02K 3/522* (2013.01);
(Continued)

(58) Field of Classification Search
CPC ....................................................... H02K 3/28
See application file for complete search history.

(56) References Cited

U.S. PATENT DOCUMENTS 4,550,267 A    10/1985 Vaidya
4,847,982 A *  7/1989 Morrill .................... H02K 3/28
                                                              29/596
(Continued)

FOREIGN PATENT DOCUMENTS

DE         19842170      3/2000
DE       202005016915    1/2006
(Continued)

OTHER PUBLICATIONS

International Search Report for Application No. PCT/EP2015/081267 dated Apr. 14, 2016 (English Translation, 3 pages).

*Primary Examiner* — Robert W Horn
(74) *Attorney, Agent, or Firm* — Michael Best & Friedrich LLP

(57) ABSTRACT

Disclosed are a stator (10) for an electric machine (12) and a method for manufacturing a stator of said type which comprises a stator body (34) that has radial stator teeth (14); each stator tooth (14) accommodates exactly one coil section (18) of an electric winding (16); the winding (16) consists of exactly two separate winding strands (24, 25) which are wound from exactly two separate winding wires (22) and each of which has three phases (26) comprising at least two coil sections (18, 17) each.

24 Claims, 5 Drawing Sheets

(51) Int. Cl.
    *H02K 3/52*      (2006.01)
    *H02K 1/16*      (2006.01)
    *H02K 1/18*      (2006.01)
    *H02K 15/00*     (2006.01)
(52) U.S. Cl.
    CPC ....... *H02K 15/0056* (2013.01); *H02K 15/095* (2013.01); *H02K 2203/09* (2013.01)

(56) References Cited

U.S. PATENT DOCUMENTS

| | | | | |
|---|---|---|---|---|
| 5,394,045 | A * | 2/1995 | Takehara | H02K 3/28 310/184 |
| 5,929,549 | A * | 7/1999 | Trago | H02K 16/04 310/112 |
| 6,952,064 | B2 * | 10/2005 | Hiwaki | H02K 1/146 310/214 |
| 8,035,263 | B2 * | 10/2011 | Kienzler | H02K 3/522 310/179 |
| 8,608,462 | B2 * | 12/2013 | Taema | H02K 3/522 417/423.7 |
| 10,056,808 | B2 * | 8/2018 | Pozmantir | H02K 21/16 |
| 10,256,682 | B2 * | 4/2019 | Wang | H02K 1/165 |
| 2005/0082931 | A1 * | 4/2005 | Burgbacher | H02K 3/522 310/179 |
| 2007/0057591 | A1 * | 3/2007 | Takahashi | H02K 3/28 310/180 |
| 2007/0296292 | A1 * | 12/2007 | Kienzler | H02K 3/522 310/71 |
| 2009/0200889 | A1 * | 8/2009 | Halstead | H02K 3/04 310/208 |
| 2009/0200890 | A1 * | 8/2009 | Halstead | H02K 3/04 310/208 |
| 2010/0289370 | A1 * | 11/2010 | Roth | H02K 1/276 310/156.53 |
| 2012/0043155 | A1 | 2/2012 | Feurrohr | |
| 2012/0126646 | A1 | 5/2012 | Nakagawa et al. | |
| 2014/0346910 | A1 | 11/2014 | Nakano et al. | |
| 2015/0028704 | A1 * | 1/2015 | Ohsawa | H02K 3/12 310/71 |
| 2015/0280505 | A1 * | 10/2015 | Tanaka | H02K 3/28 310/71 |
| 2015/0364955 | A1 | 12/2015 | Kumann | |
| 2017/0018985 | A1 * | 1/2017 | Suzuki | H02K 3/34 |
| 2017/0366060 | A1 * | 12/2017 | Haberkorn | H02K 3/522 |
| 2018/0034331 | A1 * | 2/2018 | Csoti | H02K 3/28 |
| 2018/0166932 | A1 * | 6/2018 | Desai | H02K 1/148 |
| 2018/0262075 | A1 * | 9/2018 | Csoti | H02K 3/522 |
| 2019/0013710 | A1 * | 1/2019 | Kawasaki | H02K 3/18 |
| 2019/0068018 | A1 * | 2/2019 | Hori | H02P 25/22 |

FOREIGN PATENT DOCUMENTS

| | | |
|---|---|---|
| DE | 102009000681 | 8/2010 |
| DE | 102011120985 | 6/2013 |
| DE | 102012224153 | 6/2014 |
| DE | 102013208570 | 11/2014 |
| EP | 2685602 | 1/2014 |

\* cited by examiner

STATOR FOR AN ELECTRIC MACHINE, AND METHOD FOR MANUFACTURING SAME

BACKGROUND OF THE INVENTION

The invention relates to a stator for an electric machine, and to an electric machine, and to a method for producing a stator.

DE 10 2012 224 153 A1 has disclosed a stator of an electric machine, in the case of which an insulating lamination and an interconnect disk are arranged axially on a lamination stack. The stator is for example enwound with needle windings, wherein the individual sub-coils are connected to one another by means of connecting wires at the outer circumference of the interconnect disk. Here, the entire winding is wound continuously in unipartite fashion by means of a single winding wire.

For safety-critical electric motor applications, for example in power steering systems, the intrinsic safety of such electrical windings is a recurrent point of discussion. Here, there is the risk that, in the event of damage to the insulating lacquer of the winding wire, for example, a short circuit of the winding can arise, which leads to blockage of the electric motor. It is sought to eliminate such a risk by means of the solution according to the invention.

SUMMARY OF THE INVENTION

The apparatus according to the invention and the method according to the invention have the advantage in relation to this that, by means of the embodiment of the electrical stator winding as two electrically entirely mutually separate winding strands, it is ensured that, even in the event of a short circuit of one winding strand, the motor can continue to be operated by means of the other winding strand. Here, the power of the electric motor may duly be reduced, but it remains possible to continue reliably implementing safety-relevant applications, such as for example the steering of a vehicle, possibly by imparting an increased manual force. If the winding is formed with two sets of three phases, the motor can, in the event of a short circuit, continue to be operated with the remaining three phases, wherein each phase is made up of at least two sub-coils which are wound onto different stator teeth.

Accordingly, the stator body is preferably formed as a continuous ring in a circumferential direction, wherein the individual stator teeth are integrally formed radially inwardly on said stator body. The stator preferably has twelve stator teeth, though embodiments with 18 or 24 stator teeth are also possible.

The stator body is advantageously constructed in layered fashion from individual sheet-metal laminations which together form a lamination stack. To reduce the detent torque of the electric machine, the individual stator laminations are particularly expediently rotationally offset with respect to one another in the circumferential direction, such that the longitudinal direction of the stator teeth deviates from the axial direction by a certain skew angle. Here, in each case all of the stator teeth form, with the outer yoke ring of the stator, in each case one unipartite stator lamination which is closed in the circumferential direction.

To achieve intrinsic safety of the electric motor, the first winding strand is arranged geometrically entirely on a first stator half, and the second winding strand is arranged entirely on the opposite stator half. In this way, the motor is divided into two motor halves, wherein, in the event of a short circuit, it is always the case that one motor half (angular region of 180° of the stator body) remains functional. In this embodiment, it is particularly advantageous that, in the case of the interconnect plate, there are no crossing points of the connecting wires between the individual sub-coils, whereby the likelihood of a short circuit is further reduced. On both axial face sides of the stator body, there is arranged in each case one insulating lamination for the purposes of insulating the electrical winding with respect to the sheet-metal laminations. Here, at least one of the two insulating laminations has guide elements which are formed in unipartite fashion on the insulating lamination and into which the connecting wires can be laid between the sub-coils during the winding process. In order that the individual connecting wires do not make contact, they are arranged on the insulating lamination in axially different planes. To minimize the interconnection complexity of the individual sub-coils, it is always the case that in each case two sub-coils situated geometrically directly adjacent to one another in the circumferential direction are connected to form a so-called sub-coil pair, which, for example in the case of a 12-toothed stator, forms one complete phase in each case. It is particularly advantageously the case here that two immediately adjacent sub-coils are wound directly in succession in terms of time without interruption, whereby a very short connecting wire between said two sub-coils of the sub-coil pair is formed.

Furthermore, a sub-coil pair may also be produced by virtue of a first sub-coil with a wire start firstly being wound and then an adjacent stator tooth being wound in the circumferential direction at the end of a winding strand, wherein then, the wire end is connected to the wire start, such that said connection likewise forms a short connecting wire of a sub-coil pair. Here, the wire start and the wire end are clamped into corresponding receptacles of the insulating lamination in order to reliably fix these. For this purpose, the receptacles may be of labyrinthine form.

After the winding process, the short connecting wires of the respective sub-coil pairs all lie in the same axial plane. For the interconnection of the individual sub-coils, a so-called interconnect plate is mounted axially onto the insulating lamination, wherein different interconnection concepts can be realized by means of different interconnect plates. Here, the connecting wires laid in the guide elements form a defined interface, which connecting wires are connectable to corresponding fastening sections of the conductor elements. Here, it is for example possible for an interconnect plate to electrically connect two sub-coil pairs to form a common phase with a total of four sub-coils, or else to actuate all sub-coil pairs in each case as separate phases with only two sub-coils. For this purpose, the interconnect plate has different conductor elements, which altogether have only three or else for example six terminal plugs for the motor control unit.

The interconnect plate is in the form of a plastics ring which is arranged axially on the sub-coils. The internal opening of said plastics ring corresponds in this case approximately to the internal stator opening into which the rotor can then be inserted. The outer diameter of the plastics ring is smaller than the outer circumference of the insulating lamination, such that the plastics ring can be inserted radially within the outer circumference of the insulating lamination. By means of this embodiment, the interconnect plate does not take up any additional radial structural space.

For the reliable positioning of the terminal plugs, axial projections are formed in unipartite fashion on the plastics ring, which projections serve as plug bases for the terminal plugs. The terminal plugs are angled approximately at right angles on the conductor elements, the other ends of which are electrically contacted, via the fastening sections, with the connecting wires of the winding. Here, the fastening sections form a defined connecting interface with the connecting wires, wherein the central part of the conductor elements and the terminal plugs may be designed in accordance with customer demands. If two sub-coil pairs are interconnected to form a common phase, the interconnect plate has a total of only three conductor elements in each case of unipartite form. By contrast, if it is sought for all sub-coil pairs in each case to be actuated as six separate phases, six separate conductor elements with a total of six terminal plugs are arranged on the plastics ring. The conductor elements may advantageously be formed as bent and punched parts or else as bent wires.

It is particularly expedient if always two terminal plugs are guided in a common holding element such that, both in the case of six terminal plugs and in the case of three terminal plugs, in each case only three axial projections are formed as holding elements. Here, the two adjacently arranged terminal plugs are electrically insulated with respect to one another by the plastics guides of the holding elements. Furthermore, the central parts of the conductor elements run in radially offset fashion in axially different planes, such that, in this case, too, contact between the conductor elements is prevented. In this way, it is for example the case that the first terminal plug of a holding element is electrically contacted with a sub-coil pair which is situated radially exactly opposite a further sub-coil pair (180° in the stator) which is connected to the terminal plug of the other conductor element in the same holding element.

The conductor elements can be fastened on the plastics ring in a very simple and reliable manner by means of hot stamping. For this purpose, axial rivet pins are formed on the plastics ring, which rivet pins engage through corresponding holes in the conductor elements, wherein the ends of the rivet pins are subsequently plastically deformed to form rivet heads. Alternatively, the conductor elements may be fixed by means of detent elements integrally formed on the plastics ring. If the conductor elements are formed as bent and punched parts from sheet metal, the terminal plugs can be formed very inexpensively as an installation-displacement connection, into the end-side notches of which a corresponding clamping part of the connecting plug to the control unit can be inserted.

After the installation and contacting of the interconnect plate with the connecting wires, the stator body can be installed axially into a motor housing, for example by being pressed in, shrink-fitted in or adhesively bonded in. Thereafter, a bearing bracket (53) can be joined axially onto the interconnect plate, wherein the bearing bracket (53) has, at the locations of the holding elements, corresponding cutouts for receiving the plug bases with the terminal plugs. Said cutouts in the bearing cover then form the electrical lead-throughs from the motor control unit to the electrical winding of the stator.

The electrical winding of the stator is preferably formed by means of a needle winding machine, in which a winding head lays the winding wire in along the oblique stator grooves and leads the connecting wires between the sub-coils into the corresponding guide elements of the insulating lamination. Here, for example in the case of a twelve-toothed stator, six stator teeth on the radially first stator half are wound with a first winding wire and, subsequently, the remaining six stator teeth are wound with a second, separate winding wire. Here, the wire start and the wire end of a single winding strand are preferably arranged adjacent to one another in parallel in the insulating lamination, such that said two adjacent wires can be electrically contacted jointly through the fastening sections of the conductor elements, in the same way as the individual short connecting wires of the continuously wound sub-coil pairs. In this way, two electrically insulated motor halves are realized which, depending on requirements, can also again be electrically interconnected with one another in a simple manner via a corresponding interconnect plate by means of the defined interfaces of the connecting wires.

BRIEF DESCRIPTION OF THE DRAWINGS

Exemplary embodiments of the invention are illustrated in the drawings and discussed in more detail in the following description. In the drawings:

FIG. 3, FIGS. 5 and 6 show an exemplary embodiment as per FIG. 3 with a mounted interconnect plate, and FIG. 7 schematically shows the conductor elements of the interconnect plate without a plastics body.

DETAILED DESCRIPTION

Figure 1:
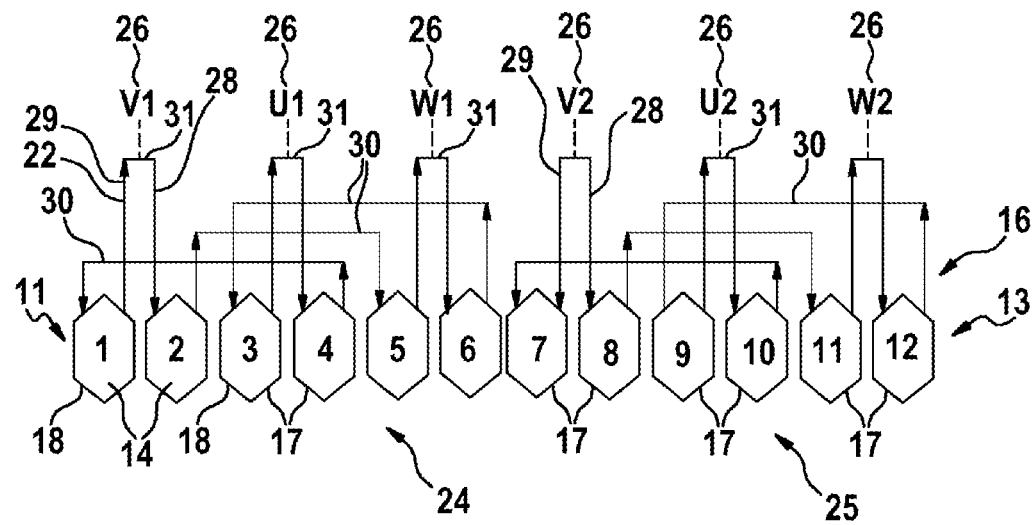
FIG. 1 schematically shows a winding diagram according to the invention.

FIG. 1 schematically illustrates a cut-open stator 10, on the stator teeth 14 of which the winding diagram of the electrical winding 16 according to the invention is illustrated. The stator 10 has for example twelve stator teeth 14, wherein in each case always exactly one sub-coil 18 is wound onto each stator tooth 14. Here, in each case two sub-coils 18 situated immediately adjacent to one another are connected by means of a short connecting wire 31 to form an adjacent sub-coil pair 20, which in this embodiment forms in each case one distinct phase 26 V1, U1, W1, V2, U2, W2. Here, the three phases 26 V1, U1, W1 form a distinct winding strand 24 which is wound from a separate winding wire 22. The three phases 26 V2, U2 and W2 form a second winding strand 25 which is wound from a second, separate winding wire 22 and which is electrically insulated with respect to the first winding strand 24, as illustrated by the dash-dotted line between the sixth and seventh stator teeth 14 in FIG. 4. The electrical winding 16 begins for example with a first wire start 28 on the second stator tooth 14, and a connecting wire 30 is led to the fifth stator tooth 14. Immediately after the fifth stator tooth 14, the sixth stator tooth 14 is wound, such that said sub-coil pair 17 is connected by means of the short connecting wire 31 for the sub-coil pair 17. After the sixth stator tooth 14, the winding wire 22 is led by means of the connecting wire 30 to the third stator tooth 14, in order there to form a sub-coil pair 17, which is connected by means of the connecting wire 31, together with the fourth stator tooth 14. From the fourth stator tooth 14, the winding wire 22 is led via the connecting wire 30 to the first stator tooth 14, where the wire end 29 of the first winding strand 24 is arranged immediately adjacent to the wire start 28. The second winding strand 25 is wound, with a separate winding wire 22, correspondingly to the winding of the first winding strand 24, such that a further three sub-coil pairs 17 of immediately adjacently arranged sub-coils 18 are formed, which are connected by means of a short connecting wire 31. The wire start 28 and the wire end 29 of the two winding strands 24, 25 are in each case electrically connected to one another. It is thus possible for six phases to be actuated separately from one another.

Figure 2:
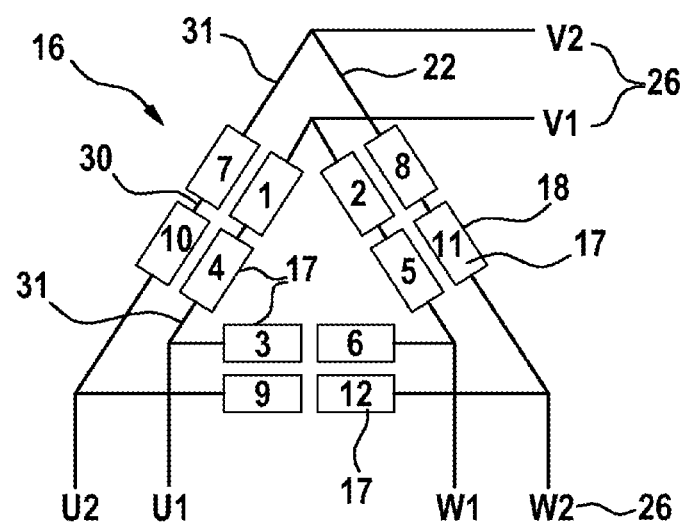
FIG. 2 shows an interconnection according to the invention of the individual phases.

This is shown for example for a delta connection in FIG. 2, in the case of which the first winding strand 24 with the three phases 26 V1, U1, W1 is electrically entirely separate from the second winding strand 25 with the three phases 26 V2, U2, W2 (whereby two separate delta connections are formed). Here, the six phases 26 are fed with current in each case via the short connecting wires 31, which are arranged in each case between two adjacently arranged sub-coils 18 on immediately adjacently arranged stator teeth 14. In the exemplary embodiment, the stator 10 has a total of 12 stator teeth 14, though embodiments are also conceivable in which each of the six phases 26 has for example a total of three or four sub-coils 18, which are correspondingly wound onto 18 or 24 stator teeth 14.

Figure 3:
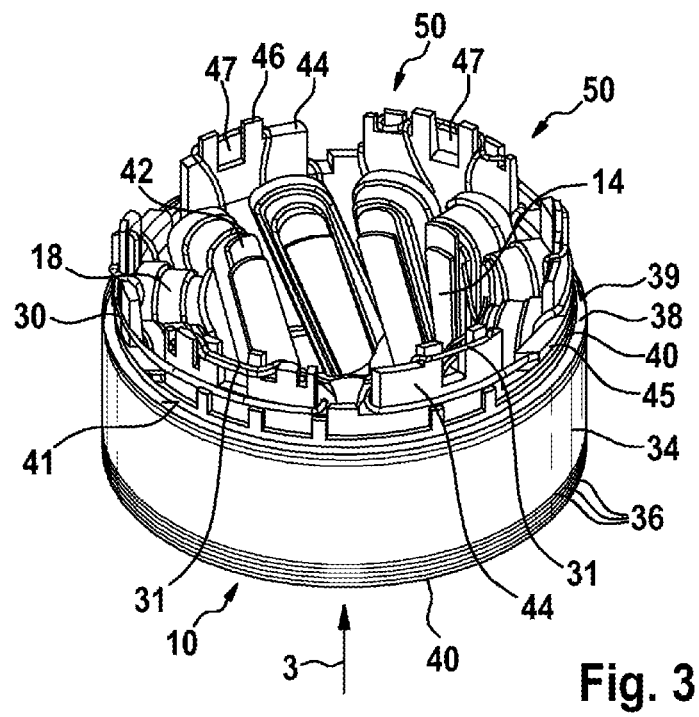
FIG. 3 shows a first exemplary embodiment of a wound stator with insulating lamination.

FIG. 3 now shows a three-dimensional view of a stator 14 which has been wound correspondingly to the winding diagram from FIG. 1. The stator 14 has a stator body 34 which is for example assembled from individual sheet-metal laminations 36. Here, the stator body 34 comprises a ring-shaped closed return yoke 38 on which the stator teeth 14 are radially inwardly integrally formed. In the interior, the stator 14 has a circular cutout into which a rotor (not illustrated) can be inserted, as can be seen more clearly in FIG. 4. The stator teeth 14 extend inward in a radial direction 4 and along the rotor axis in an axial direction 3. In the exemplary embodiment, the stator teeth 14 are formed so as to be skewed in the circumferential direction 2 in order to reduce the detent torque of the motor. For this purpose, it is for example the case that the sheet-metal laminations 36 are correspondingly rotationally offset with respect to one another in the circumferential direction 2. Before the stator body 34 is enwound, insulating laminations 40 are mounted onto the two axial face sides 39 in order to electrically insulate the winding wire 22 with respect to the stator body 34. At least one of the two insulating laminations 40 has a ring-shaped closed circumference 41, from which insulating teeth 42 extend in the radial direction 4, which insulating teeth cover the face sides 39 of the stator teeth 14. On the ring-shaped circumference 41 of the insulating lamination 40, there are formed guide elements 44 in which the connecting wires 30, 31 are led between the sub-coils 18. For this purpose, it is for example the case that grooves 45 in the circumferential direction 2 are formed on the outer circumference 41, such that the connecting wires 30, 31 are arranged in axially offset planes in order to prevent the connecting wires 30, 31 from crossing over. The short connecting wires 31 between the sub-coil pairs 17 are arranged in the uppermost axial plane, wherein in particular all six short connecting wires 31 for the contacting of the phase terminals all run in the same axial plane. For this purpose, two axial projections 46 are always formed between two sub-coils 18 of a sub-coil pair 17, which projections are separated from one another by an interposed radial aperture 47. Thus, the short connecting wires 31 of the sub-coil pairs 17 are freely accessible from all sides and, in particular in the region of the radial aperture 47, do not bear against the insulating lamination 40. The two wire starts 28 and wire ends 29 are, in this exemplary embodiment, fixed in a labyrinth arrangement 50, which labyrinth arrangements are each arranged immediately adjacent, in the circumferential direction 2, to the two axial projections 46 which are spaced apart by a radial aperture 47. It can thus be seen in FIG. 3 that the wire start 28 of the first winding strand 24 runs, over the circumferential region of the radial aperture 47, parallel and immediately adjacent to the wire end 29 of the first winding strand 24. Here, the wire start 28 is arranged in a first labyrinth arrangement 50 on one side of the radial aperture 47, and the wire end 29 of the first winding strand 24 is arranged in a second labyrinth arrangement 50 opposite the radial aperture 47 in the circumferential direction 2. By means of this parallel arrangement of the short connecting wires 31, these can be electrically contacted in the same way as the individual connecting wires 31 of the continuously wound sub-coil pairs 17 for the purposes of the phase actuation.

Figure 4:
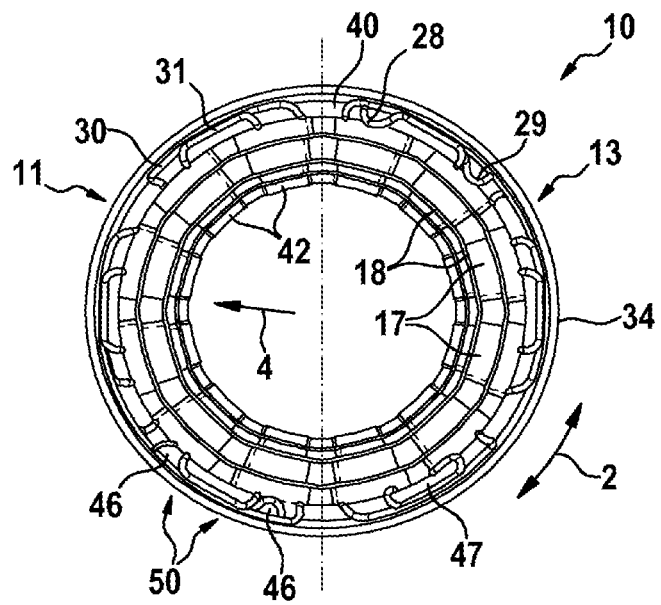
FIG. 4 shows a corresponding plan view as per

In FIG. 4, it can likewise be clearly seen that the two connecting wires 31 running parallel are arranged at the same radius. The free ends of the wire start 28 and of the wire end 29 end directly after the corresponding labyrinth arrangements 50, such that they do not protrude radially beyond the connecting wires 30, 31. The connecting wires 30, 31 all run in the circumferential direction 2 along the guide elements 44 and lie radially outside the sub-coils 18 wound onto the stator teeth 14. In FIG. 4, the two motor halves 11, 13 are schematically separated by the dash-dotted line, wherein the left-hand motor half 11 is electrically insulated with respect to the right-hand motor half 13. The electrical winding 16 is manufactured for example by means of needle winding, wherein the connecting wires 30, 31 can, by means of a winding head, be led radially outward between the sub-coils 18 and laid in the guide elements 44. In this embodiment, all connecting wires 30, 31 are arranged axially on one side of the stator body 34. In an alternative embodiment which is not illustrated, it is also possible for a part of the connecting wires 30, 31 to be laid onto the axially opposite side of the stator 14. Here, it is for example possible for the short connecting wires 31 for the contacting of the phase actuation to be arranged in a first insulating lamination 40, and for the other connecting wires 30, which connect the different sub-coil pairs 17 to one another in each case, to be led on the axially oppositely arranged insulating lamination 40.

Figure 5:
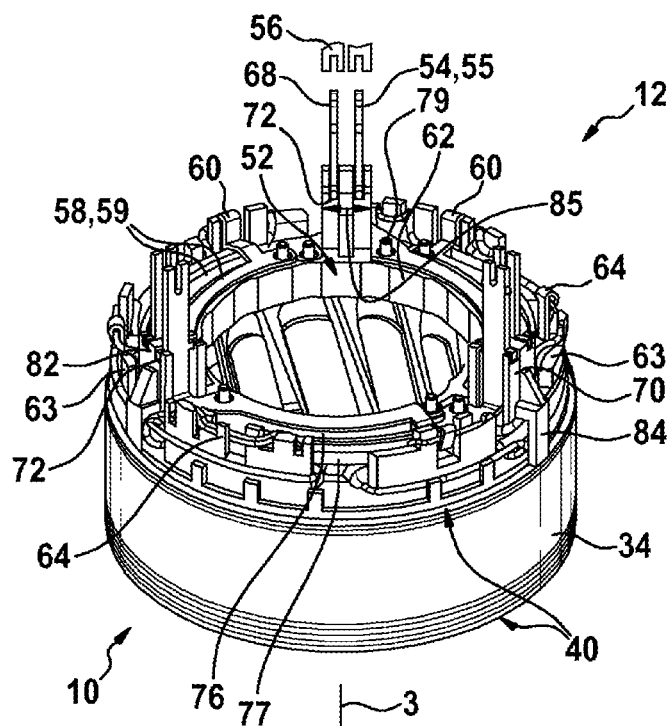

In FIG. 5, an interconnect plate 52 has been mounted onto the embodiment of the stator 10 as per FIG. 3, by means of which interconnect plate the electrical winding 16 is actuated. For this purpose, the interconnect plate 52 has terminal plugs 54 to which customer-specific connecting plugs 56 of a control unit can be joined. In this embodiment, exactly six terminal plugs 54 are provided, which are in each case electrically connected to one phase 26 of the electrical winding 16. Here, each phase 26 is formed by exactly one sub-coil pair 17, such that the six terminal plugs 54 are contacted with exactly six connecting wires 31 of adjacent sub-coil pairs 17. For this purpose, the interconnect plate 52 has exactly six conductor elements 58 which, on an axially angled end, have the terminal plugs 54 and, on the other end, have a fastening section 60 which is electrically connected, for example welded, to the connecting wires 31. The interconnect plate 52 has a plastics body 62 which is formed as a closed ring 61 through which the rotor can be inserted into the stator 10. On the plastics body 62 there are integrally formed in unipartite fashion holding elements 63 which extend away from the stator body 34 in the axial direction 3. The conductor elements 58 extend in the circumferential direction 2 along the plastics body 62, wherein the angled terminal plugs 54 are led in the axial direction 3 within the holding elements 63. On the other end, the conductor elements 58 have the fastening section 60, the free end of which is formed as a loop 64 which surrounds the connecting wires 31. Here, the loop 64 is formed from a sheet-metal material, the cross section of which is approximately rectangular. In the exemplary embodiment, the conductor elements 58 are formed as bent and punched parts 59 composed of sheet metal, such that the loop 64 can be bent out of the free end of the fastening section 60, during the installation thereof, around the connecting wire 31. After the arrangement of the open loop 64 around the connecting wire 31, it is for example the case that electrodes are laid onto both radially oppositely situated surfaces of the loop 64, which electrodes are pressed together in the radial direction while being fed with current in order to weld the loop 64 to the connecting wire 31. Here, the insulating lacquer of the connecting wire 31 is melted, resulting in a metallic connection between the fastening section 60 and the connecting wire 31. The loop 64 is laid around the connecting wire 31 in the region of the radial aperture 47, because in this region, no guide element 44 is arranged between the connecting wire 31 and the loop 64. As a result, sufficient free space is available for the electrodes to be laid on, such that a free limb end 65 of the loop 64 can be pressed against the fastening section 60, whereby the loop 64 is closed. Here, depending on the sub-coil pair 17, the loop 64 surrounds only a single connecting wire 31 or simultaneously surrounds 2 connecting wires 31 which run adjacent to one another in parallel and which are formed from the wire start 28 and the wire and 29 of a single winding strand 24, 25. The terminal plugs 54 are for example formed as insulation-displacement connections 55 which, at their free axial end 68, have a notch 69 into which a wire or a clamping element of the corresponding connecting plug 56 of the customer can be inserted. Furthermore, a transverse web 70 is formed in the radial direction 4 on the terminal plug 54, which transverse web is correspondingly supported on an axial stop 72 of the holding element 63. Furthermore, on the holding element 63, a first guide surface 74 and a second guide surface 75 are formed which support the terminal plug 54 in the two opposite circumferential directions 2. This prevents the terminal plugs 54 from bending over or bending out in the circumferential direction 2 during the insertion of the connecting plugs 56, whereby the axial tolerances of the plug connection are ensured.

The conductor elements 58 are arranged at least partially radially adjacent to one another, whereby it is necessary for the fastening sections 60 of the inner conductor elements 58 to radially cross the outer conductor elements 58 in order to be contacted with the connecting wires 31. Therefore, the radially inner conductor elements 58 are arranged on an axially higher path 76 of the plastics body 62, and the radially outer conductor elements 58 are arranged on an axially lower-lying path 77. Here, the central sections 78, which are in the form of sheet-metal strips, of the conductor elements 58 bear areally against the plastics body 62 and are connected to the latter for example by means of rivet connections or detent elements. For this purpose, it is for example the case that axial rivet pins 79 are formed on the plastics body 62, which rivet pins engage through corresponding axial apertures 80 of the conductor elements 58. By means of heat, in particular ultrasound, the ends of the rivet bolts can be deformed to form a rivet head 81, which forms a form fit with the conductor elements 58.

In the exemplary embodiment, it is always the case that two terminal plugs 54 are arranged in a common holding element 63, wherein said terminal plugs are separated from one another in the circumferential direction 2 by a central web 82 of the holding element 63. Here, the central web 82 forms, on both sides, in each case a first and a second guide surface 74, 75 for the respectively abutting terminal plugs 54. The second and first guide surfaces 75, 74 situated in each case opposite the central web 82 are formed by corresponding counterpart surfaces 83 which extend in the radial direction 4 and axial direction 3. In the region of the holding elements 63—axially opposite these—there are integrally formed spacers 84 which support the interconnect plate 52 axially with respect to the stator body 34. In the exemplary embodiment of FIGS. 5 and 6, exactly one holding element 63 has a greater width 85 in the circumferential direction 2 than the two other holding elements 63. In this way, a rotation prevention means is realized for a bearing cover (not illustrated) which is mounted axially with correspondingly shaped axial leadthroughs onto the holding elements 63.

Figure 6:
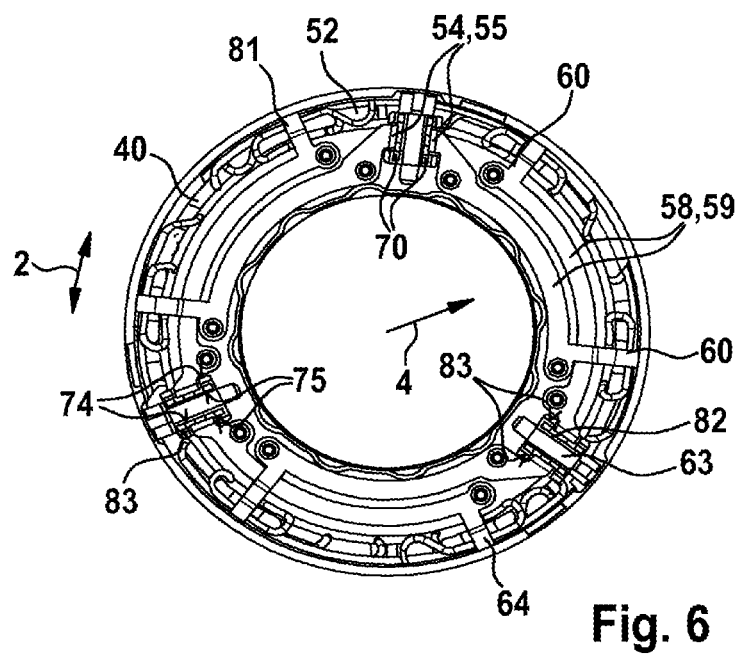

FIG. 6 shows how the two terminal plugs 54 bear at both sides against the central web 82. Angled in each case in opposite circumferential directions 2, the respective central section 78 of the conductor element 58 adjoins the terminal plug 54. Since the conductor elements 58 situated radially adjacent to one another are arranged on axially different paths 76, 77, said conductor elements do not make contact, such that they are electrically insulated with respect to one another. The inner ring of the plastics body 62 is of slightly undulating form in order that a punch tool can be engaged on the inner ends of the stator teeth 14, directly on the side surfaces thereof. In this way, the stator 10 can be pressed into a motor housing (not illustrated).

Figure 7:
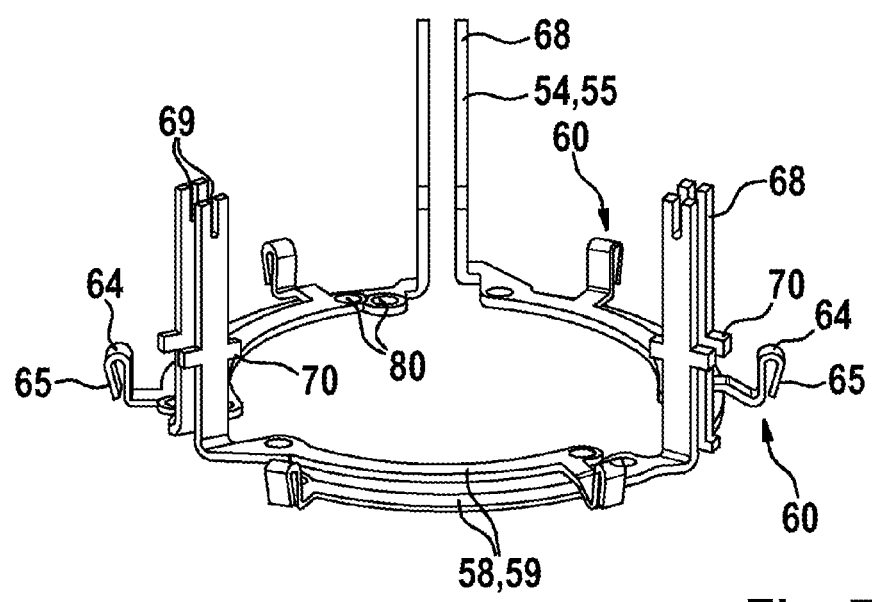
Figure 8:
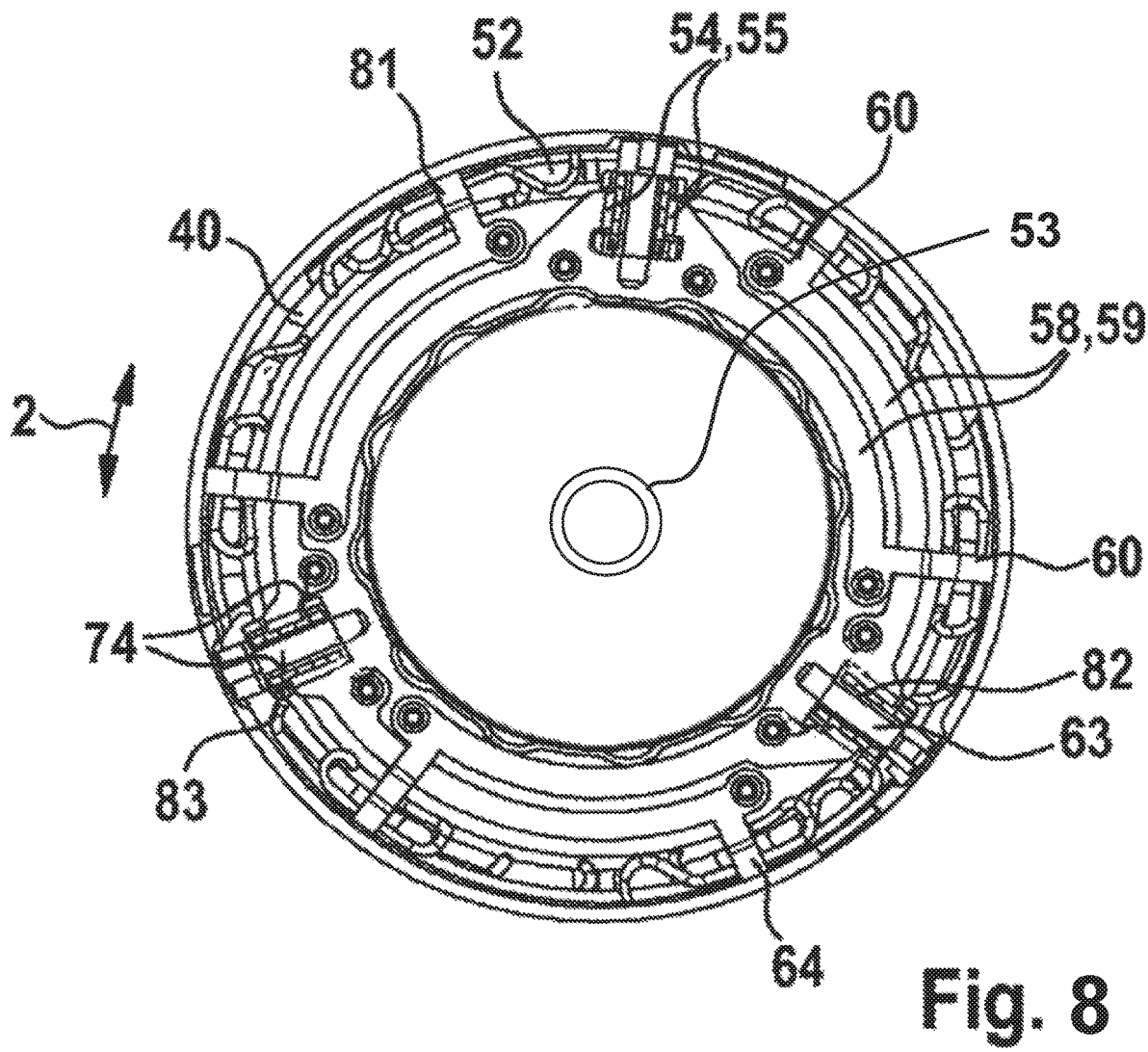
FIG. 8 shows an exemplary embodiment as per FIG. 3 with a mounted interconnect plate and including a bearing bracket.

FIG. 7 shows the six conductor elements 58 once again without a plastics body 62 of the interconnect plate 52, in order to illustrate how the six fastening sections 60, with the respective loops 64, feed current to the six phases 26 V1, U1, W1, V2, U2, W2 in accordance with the winding diagram of FIG. 1 via the respective terminal plugs 54. Via the connecting plugs 56 (not illustrated), the electrical winding 16 is thus contacted with a control unit in which, for example, the interconnection configuration as per FIG. 2 can be realized.

The invention claimed is:
1. A stator (10) for an electric machine (12), the stator comprising a stator body (34) which has radial stator teeth (14),
wherein each stator tooth (14) accommodates in each case exactly one sub-coil (18) of an electrical winding (16),
wherein the winding (16) is composed exactly of two separate first and second winding strands (24, 25) which are wound from exactly two separate winding wires (22) and which have in each case three phases (26) with in each case at least two sub-coils (18, 17),
wherein wire starts (28) and wire ends (29) of the first and second winding strands (24, 25) are fixed in each case in labyrinth-like protruding structures (50) of the insulating lamination (40),
wherein a wire start (28) and a wire end (29) of the same winding strand (24, 25) are arranged adjacent to one another in parallel over a particular circumferential region (47) such that they can be jointly contacted with a conductor element (58) of an interconnect plate (52),
wherein the interconnect plate (52) is one of a plurality of different interconnect plates (52), wherein each of the plurality of different interconnect plates (52) is configured to be mounted, in a modular construction, onto the at least one insulating lamination (40) with the connecting wires (30, 31) arranged thereon, and wherein the plurality of different interconnect plates (52) each provide customer-specific terminal plugs (54) for the supply of electricity and/or different interconnection configurations of the individual phases (26) and/or sub-coils (18).

2. A stator (10) for an electric machine (12), the stator comprising a stator body (34) which has radial stator teeth (14),
wherein each stator tooth (14) accommodates in each case exactly one sub-coil (18) of an electrical winding (16),
wherein the winding (16) is composed exactly of two separate first and second winding strands (24, 25) which are wound from exactly two separate winding wires (22) and which have in each case three phases (26) with in each case at least two sub-coils (18, 17),
wherein in each case one insulating lamination (40) is arranged on the stator body (34) on both axial face sides (39), and at least one of the two insulating laminations (40) is of closed form at an outer circumference (41) and has guide elements (44) for connecting wires (30, 31) between the individual sub-coils (18), which guide elements are arranged in axially different planes,
wherein in each case two sub-coils (18) which are situated immediately adjacent to one another are directly connected to one another by means of a continuously wound connecting wire (31) to form a sub-coil pair (17),
wherein wire starts (28) and wire ends (29) of the first and second winding strands (24, 25) are fixed in each case in labyrinth-like protruding structures (50) of the insulating lamination (40), and
wherein a wire start (28) and a wire end (29) of the same winding strand (24, 25) are arranged adjacent to one another in parallel over a particular circumferential region (47) such that they can be jointly contacted with a conductor element (58) of an interconnect plate (52).

3. The stator (10) as claimed in claim 2, characterized in that the stator body (34) has an outer, closed return ring (38) from which the stator teeth (14) extend radially inwardly.

4. The stator (10) as claimed in claim 2, characterized in that the first winding strand (24) extends in a circumferential direction (2) over a first half (11) and the second winding strand (25) extends over a second half (13) of the stator body (34), such that two motor halves (11, 13) are formed which are wound so as to be electrically insulated with respect to one another.

5. The stator (10) as claimed in claim 2, characterized in that the stator body (34) is assembled from a multiplicity of stator laminations (36), which lie one on top of another, to form a lamination stack (35).

6. The stator (10) as claimed in claim 2, characterized in that in each case one insulating lamination (40) is arranged on the stator body (34) on both axial face sides (39), and at least one of the two insulating laminations (40) is of closed form at an outer circumference (41) and has guide elements (44) for connecting wires (30, 31) between the individual sub-coils (18), which guide elements are arranged in axially different planes.

7. The stator (10) as claimed in claim 2, characterized in that the interconnect plate (52) is one of a plurality of different interconnect plates (52), wherein each of the plurality of different interconnect plates (52) is configured to be mounted, in a modular construction, onto the at least one insulating lamination (40) with the connecting wires (30, 31) arranged thereon, wherein the plurality of different interconnect plates each provide customer-specific terminal plugs (54) for the supply of electricity and/or different interconnection configurations of the individual phases (26) and/or sub-coils (18).

8. The stator (10) as claimed in claim 2, characterized in that the interconnect plate (52) has a closed ring (61) which is arranged within the closed circumference (41) of the insulating lamination (40) and has an internal opening (37) through which a rotor can be inserted axially into the stator (10).

9. The stator (10) as claimed in claim 8, characterized in that the closed ring (61) is in the form of a plastics body (62) on which holding elements (63) for axial terminal plugs (54) are integrally formed in an axial direction (3).

10. The stator (10) as claimed in claim 2, characterized in that in each case one phase (26) of the first winding strand (24) together with the corresponding phase (26) of the second winding strand (25) are connected jointly to one terminal plug (54), such that a total of exactly three terminal plugs (54) are formed on the interconnect plate (52).

11. The stator (10) as claimed in claim 2, characterized in that each individual phase (26) is individually connected to in each case one terminal plug (54), such that a total of exactly six terminal plugs (54) for six phases (26) are formed on the interconnect plate (52).

12. The stator (10) as claimed in claim 2, characterized in that in each case two terminal plugs (54) are arranged adjacently on a common holding element (63), wherein the two terminal plugs (54) are in each case electrically connected to only one phase (26) which are in each case situated radially exactly opposite one another in the stator body (34).

13. The stator (10) as claimed in claim 9, characterized in that the conductor elements (58) are arranged radially adjacent to one another on the interconnect plate (52) and are fixed to the plastics body (62).

14. An electric machine having a stator (10) as claimed in claim 1, wherein the stator (10) is located within a cylindrical motor housing, and wherein bearing brackets for mounting a rotor shaft of a rotor close off the motor housing axially.

15. A method for producing a stator as claimed in claim 1, the method comprising
needle winding a first winding strand (24) in a first half (11) of the stator body (34), and
subsequently, winding the second winding strand (25) by means of a second, separate winding wire (22) in a second half (13) of the stator body (34).

16. The stator (10) as claimed in claim 2, characterized in that the stator body (34) has an outer, closed return ring (38) from which the stator teeth (14) extend radially inwardly, wherein exactly twelve stator teeth (14) are provided.

17. The stator (10) as claimed in claim 2, characterized in that the stator body (34) is assembled from a multiplicity of stator laminations (36), which lie one on top of another, to form a lamination stack (35), wherein the individual stator laminations (36) are rotationally offset with respect to one another in the circumferential direction (2) so as to form skewed stator teeth (14).

18. The stator (10) as claimed in claim 2, characterized in that the interconnect plate (52) has a closed ring (61) which is arranged radially within the guide elements (44) of the insulating lamination (40) and has an internal opening (37) through which a rotor can be inserted axially into the stator (10).

19. The stator (10) as claimed in claim 9, characterized in that the closed ring (61) is in the form of a plastics body (62) on which holding elements (63) for the axial terminal plugs (54) are integrally formed in an axial direction (3), which holding elements are formed in unipartite fashion with conductor elements (63) which are electrically connectable to the connecting wires (30, 31).

20. The stator (10) as claimed in claim 9, characterized in that in each case two terminal plugs (54) are arranged adjacently on a common holding element (63), wherein the two terminal plugs (54) are in each case electrically connected to only one adjacent sub-coil pair (17) which are in each case situated radially exactly opposite one another in the stator body (34).

21. The stator (10) as claimed in claim 19, characterized in that the conductor elements (58) are arranged radially adjacent to one another on the interconnect plate (52) and are fixed to the plastics body (62) by means of hot caulking or detent elements, wherein the conductor elements (58) are in the form of bent and punched parts (59), the angled ends (68) of which are formed as an insulation-displacement connection (55) in order to form the terminal plugs (54).

22. An electric machine having a stator (10) as claimed in claim 9, wherein the stator (10) is located within a cylindrical motor housing, and wherein bearing brackets for mounting a rotor shaft of a rotor close off the motor housing axially, wherein leadthroughs for the holding elements (63) of the terminal plugs (54) are formed on a bearing cover.

23. An electric machine having a stator (10) as claimed in claim 2, wherein the stator (10) is located within a cylindrical motor housing, and wherein bearing brackets for mounting a rotor shaft of a rotor close off the motor housing axially.

24. A method for producing a stator as claimed in claim 4, the method comprising
  needle winding a first winding strand (24) in the first half (11) of the stator body (34), and
  subsequently, winding the second winding strand (25) by means of a second, separate winding wire (22) in the second half (13) of the stator body (34).

\* \* \* \* \*